(12) United States Patent
Memmer

(10) Patent No.: US 6,685,854 B2
(45) Date of Patent: Feb. 3, 2004

(54) ELECTRICALLY CONDUCTIVE POLYMERIC MIXTURE, METHOD OF MOLDING CONDUCTIVE ARTICLES USING SAME, AND ELECTRICALLY CONDUCTIVE ARTICLES FORMED THEREFROM

(75) Inventor: Timothy L. Memmer, Perrysburg, OH (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/832,239

(22) Filed: Apr. 10, 2001

(65) Prior Publication Data

US 2002/0145131 A1 Oct. 10, 2002

(51) Int. Cl.$^7$ .......................... H01B 1/20; F16L 11/127
(52) U.S. Cl. ................... 252/503; 210/243; 137/356; 138/118
(58) Field of Search ................. 252/503, 511; 210/243; 137/343, 356; 428/35.8; 138/118

(56) References Cited

U.S. PATENT DOCUMENTS

| | | | |
|---|---|---|---|
| 4,566,990 A | * | 1/1986 | Liu et al. ............... 252/503 |
| 4,569,786 A | * | 2/1986 | Deguchi ............... 252/503 |
| 4,596,670 A | * | 6/1986 | Liu ....................... 252/511 |
| 5,076,920 A | | 12/1991 | Dankowski et al. |
| 5,256,335 A | | 10/1993 | Byrd et al. |
| 5,273,685 A | * | 12/1993 | Takata et al. ......... 252/511 |
| 5,281,363 A | | 1/1994 | Shacklette et al. |
| 5,366,664 A | * | 11/1994 | Varadan et al. ....... 252/512 |
| 5,378,403 A | | 1/1995 | Shacklette |
| 5,399,295 A | * | 3/1995 | Gamble et al. ....... 252/511 |
| 5,520,852 A | | 5/1996 | Ikkaala et al. |
| 5,531,932 A | | 7/1996 | Karna et al. |
| 5,662,833 A | | 9/1997 | Laakso et al. |
| 5,714,053 A | | 2/1998 | Howard |
| 5,783,111 A | | 7/1998 | Ikkala et al. |
| 5,798,048 A | * | 8/1998 | Ries ...................... 210/767 |
| 5,853,865 A | | 12/1998 | McHugh et al. |
| 5,866,043 A | | 2/1999 | Ikkala et al. |
| 5,917,693 A | | 6/1999 | Kono et al. |
| 5,937,911 A | * | 8/1999 | Kodama et al. ....... 138/137 |
| 5,958,303 A | | 9/1999 | Narkis et al. |
| 6,024,895 A | | 2/2000 | Shimizu et al. |
| 6,030,550 A | | 2/2000 | Angelopoulos et al. |
| 6,149,840 A | | 11/2000 | Ardakani et al. |
| 6,350,801 B1 | * | 2/2002 | Asano et al. .......... 524/377 |

FOREIGN PATENT DOCUMENTS

JP          62-13444       * 1/1987

* cited by examiner

*Primary Examiner*—Mark Kopec

(57) ABSTRACT

A thermally stable electrically conductive polymer mixture, for use in forming electrically conductive molded articles, includes at least two additives for contributing to the polymer mixture's electrical conductivity. At least one of the additives concentrates at or near the surface of a molded article for electrical surface conductivity, while at least one other additive concentrates at or near the core of a molded article to heighten electrical core conductivity to promote electrostatic discharge.

9 Claims, 3 Drawing Sheets

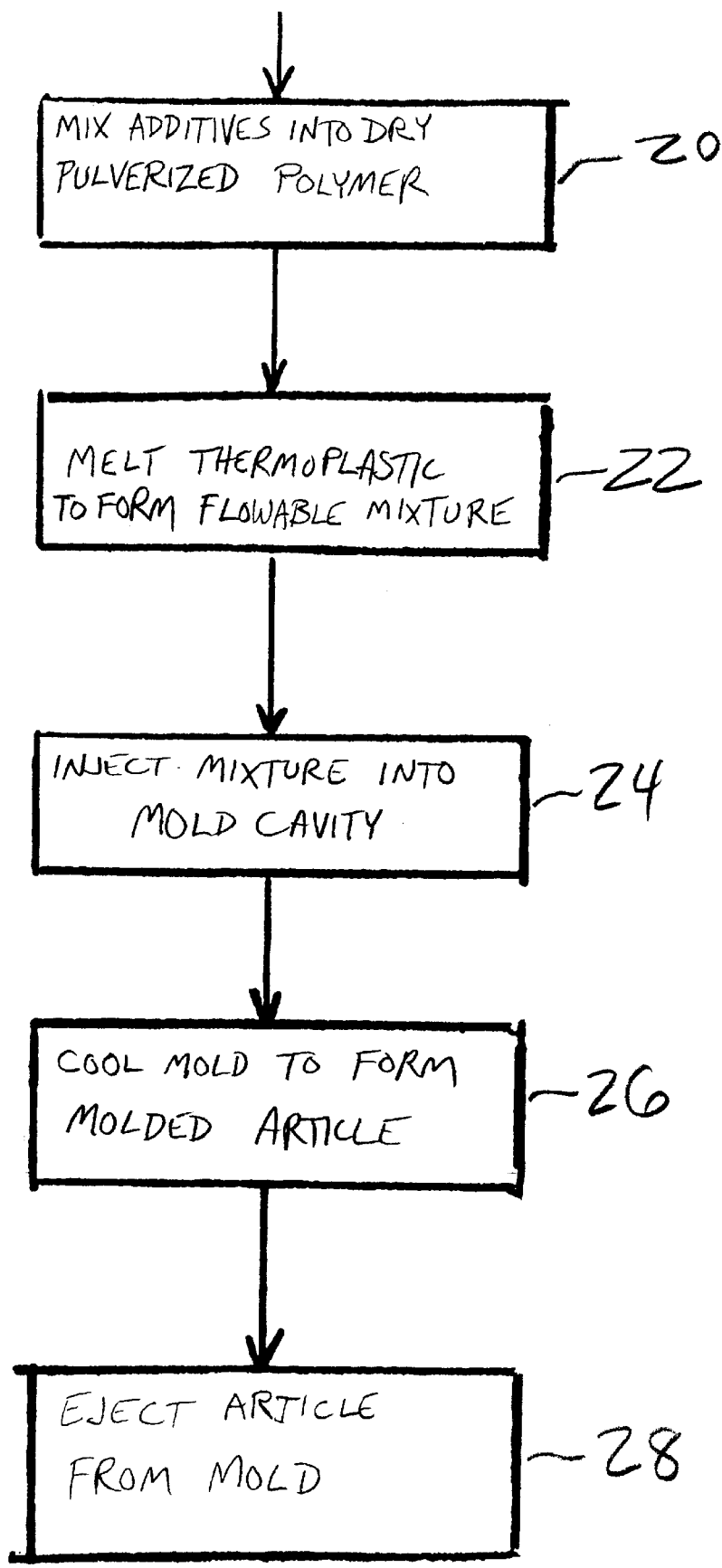

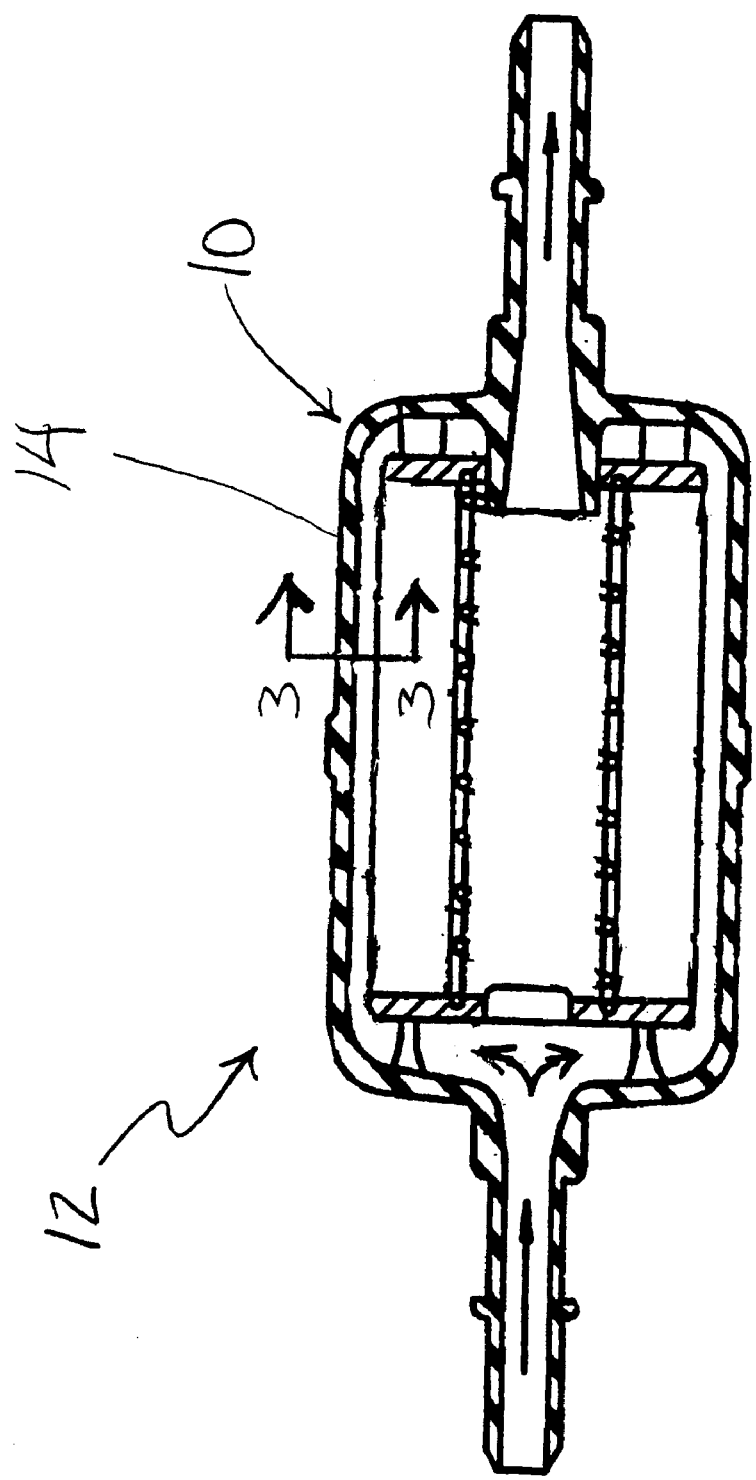

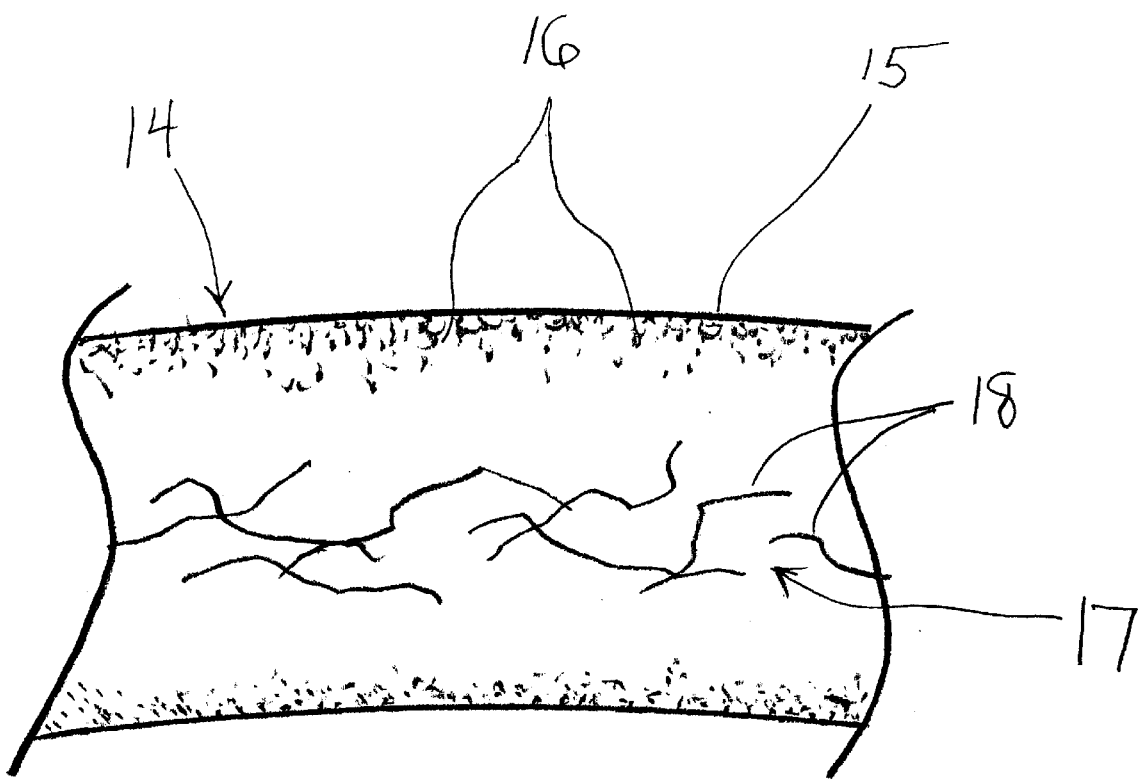

ELECTRICALLY CONDUCTIVE POLYMERIC MIXTURE, METHOD OF MOLDING CONDUCTIVE ARTICLES USING SAME, AND ELECTRICALLY CONDUCTIVE ARTICLES FORMED THEREFROM

BACKGROUND OF THE INVENTION

1. Field of the Invention

The present invention relates to electrically conductive polymer compositions, to methods of use thereof, and to electrically conductive articles produced therefrom. More particularly, the present invention relates to a polymeric mixture containing at least two conductive additives, to provide both surface conductivity and internal conductivity, without significantly affecting the physical properties of the polymer. The present invention further relates to methods of forming molded articles using the polymeric mixture, and to electrically conductive molded articles formed therefrom.

2. Description of the Background Art

Selected electrically conductive polymers are known and used in industrial settings, particularly in the manufacture of electronic component parts. Some examples of electrically conductive polymer compositions are illustrated in U.S. Pat. Nos.: 5,256,335; 5,281,363; 5,378,403; 5,662,833; 5,958,303; 6,030,550; and 6,149,840.

U.S. Pat. No. 5,281,363 to Shacklette et al. is directed towards discrete particles formed of an electrically conductive polyaniline composition, which may be between 0.05 microns and 100 microns in size. In the particles of the '363 patent to Shacklette et al, a first dopant predominates at or near the surface of the particle, and a second dopant predominates at or near the core of the particle. The disclosure of Shacklette et al. is not specifically directed to molded articles, or to concentrations of electrically conductive additives in molded articles. The Shaklette patent offers surface and core conductivity within a particle; however, this invention utilizes salts and/or acids as surface additives which may provide a lower rate of conductivity than optimally possible, and which may also afford a limited range of thermal stability.

U.S. Pat. No. 5,662,833 to Laasko et al. discloses electrically conducting thermoset compositions, in which a thermoset matrix contains a polyaniline protonated with a protonic acid containing at least one hydroxyl group. In the Background section of Laasko, conductive plastics are generally categorized as either filled conductive plastics or intrinsically conductive plastics. While this reference goes on to list several conductive particles which are usable as additives in filled conductive plastics, it does not teach or suggest using a combination of these additives to provide both surface conductivity and core conductivity in a molded article.

While polymer compositions provide an electrically conductive medium, difficulty arises in creating molded articles having both efficient surface conductivity and electrostatic discharge (ESD) capabilities. To utilize both electrical surface conductivity and ESD efficiently, conducting agents are necessary additives to the polymer's composition. Selecting an additive that performs a dual function of surface conductivity and ESD is difficult, since efficient surface conductivity requires that the additive concentrate on or near the surface of the polymer, and efficient ESD requires that the additive concentrate around the core of the polymer.

Adding a sufficient quantity of a single conducting agent to a polymer's composition to provide effective ESD, while also providing efficient surface conductivity, often diminishes the physical properties of the polymer. The problem of preserving the physical properties of a polymer while attempting to generate both efficient surface conductivity and ESD remains elusive.

As a result, a need still exists in the art of electrically conductive polymer compositions for a material or mixture that provides both surface conductivity and ESD performance. In particular, there is a need for a material that operates to conduct electrical current on the surface area and provides electrostatic discharge without significantly diminishing the physical properties of the polymer composition.

One example of a possible application of a conductive polymeric material is in a plastic fuel filter housing. Contemporary fuel filters are formed using plastic housings in many instances today. Unfortunately, there is some risk that a fuel filter may build up static electricity within the plastic housing thereof.

In the event that a plastic fuel filter housing, having fuel stored therein, was exposed to a spark caused by sudden electrostatic discharge, the consequences could be hazardous if such a spark were to ignite fuel in, on or near the fuel filter. Accordingly, it would be desirable to form a plastic housing for a fuel filter in which the housing could be electrically conductive, and could be connected to ground in order to avoid the buildup of static electricity therein, and consequent sudden electrostatic discharge.

SUMMARY OF THE INVENTION

The present invention has been developed to overcome the foregoing limitations and disadvantages of known electrically conductive polymer compositions, and to generally fulfill a need in the art for a dual conductive polymer which provides both surface area electrical conductivity and electrostatic discharge, while maintaining the physical properties of the polymer composition.

The polymeric mixture according to the present invention conducts electricity primarily through the inclusion of electrically conductive additives, rather than by using inherently conductive polymers. In practicing the invention, two different additives are used, a first additive to provide surface conductivity and a second additive to provide core conductivity.

An electronically conductive polymer composition, in accordance with the present invention, includes a) a polymeric material;

b) a first electrically conductive additive selected from the group consisting of metallic fibers and metallic particles; and c) a second electrically conductive additive selected from the group consisting of carbon fibers and carbon particles.

Such an electrically conductive polymer composition is advantageous because it provides both surface conductivity and electrostatic discharge capability, without diminishing the physical properties of the polymer composition.

Preferably, the polymeric material is a thermoplastic selected from the group consisting of polyamides, polyimides, polyesters, polyolefins, polysulfones, fluoropolymers, and mixtures thereof. Particularly preferred polymeric materials are acetal and nylon 12.

Preferred additives are carbon particles and stainless steel fibers, and most preferably, the mixture contains both carbon powder and stainless steel fibers together.

The present invention also relates to a method of making an electrically conductive molded article, comprising the steps of:

a) injecting a polymer mixture into a mold cavity having formed within a hollow mold, said mold cavity having an outer periphery;

said polymer mixture comprising:
  a polymeric material;
  a first electrically conductive additive selected from the group consisting of metallic fibers and metallic particles; and
  a second electrically conductive additive selected from the group consisting of carbon fibers and carbon particles;
  whereby the first electrically conductive additive migrates away from the outer periphery of the mold cavity, and the second electrically conductive additive migrates toward the outer periphery of the mold cavity;
b) curing the polymer in the hollow mold to form a molded article; and
c) ejecting the molded article from the mold.

The present invention also relates to an electrically conductive molded article which is a product of the above-described process. In particular, one example of a useful molded article in accordance with the invention is a fuel filter housing.

Accordingly, it is an object of the present invention to provide a mixture which is suitable for forming electrically conductive molded articles able to conduct electric current within the surface area thereof, and consistently performing electrostatic discharge while maintaining the structural integrity of the polymer composition.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 1 is a schematic diagram showing a sequence of steps in forming a molded article according to a method of the present invention;

FIG. 2 is a cross-sectional view of a fuel filter; and

FIG. 3 is a simplified cross section, partially cut away, of part of a side wall of the fuel filter housing of FIG. 2, taken along the line 3—3.

DETAILED DESCRIPTION OF THE PREFERRED EMBODIMENTS

In a first embodiment thereof, the present invention provides a composition which is a mixture of a polymer and at least two different electrically conductive additives. A mixture in accordance with the present invention, generally, includes:
a) a pulverized polymeric material;
b) a first electrically conductive additive selected from the group consisting of metallic fibers and metallic particles; and
c) a second electrically conductive additive selected from the group consisting of carbon fibers and carbon particles.

Preferably, the pulverized polymeric material is a thermoplastic. Suitable thermoplastic materials usable in the practice of the present invention include polyamides, polyimides, polyesters, polyolefins, polysulfones, fluoropolymers, and mixtures thereof.

One particularly preferred thermoplastic is polyacetal resin polymer, also called polyoxymethylene, which is a product of the polymerization of a formaldehyde—containing starting material. This material is often referred to by the abbreviated name "acetal" or "POM". One suitable type of acetal resin polymer, which may be used in the practice of the present invention, is that sold commercially by DuPont under the trademark "DELRIN". Another suitable thermoplastic is Nylon 12.

Most preferably, the mixture according to the invention includes both carbon particles and stainless steel fibers.

The present invention also relates to a method of making an electrically conductive molded article, comprising the steps of:
a) injecting a polymer mixture into a mold cavity having formed within a hollow mold, said mold cavity having an outer periphery;
said polymer mixture comprising:
  a polymeric material;
  a first electrically conductive additive selected from the group consisting of metallic fibers and metallic particles; and
  a second electrically conductive additive selected from the group consisting of carbon fibers and carbon particles;
  whereby the first electrically conductive additive migrates away from the outer periphery of the mold cavity, and the second electrically conductive additive migrates toward the outer periphery of the mold cavity;
b) curing the polymer in the hollow mold to form a molded article; and
c) ejecting the molded article from the mold.

The above-described method may also include preparatory steps of mixing the additives into the pulverized polymer, and melting the polymer, where a thermoplastic is used, to form the flowable mixture which is then injected into the mold.

Referring now to FIG. 1, a series of steps in one particularly preferred method according to the invention is shown schematically.

An initial step of mixing the additives into the dry pulverized polymer is shown at 20. As previously noted, the most preferred additives are carbon particles and stainless steel fibers.

The next step, shown at 22 in FIG. 1, is melting the thermoplastic polymer to form a flowable mixture.

Then, in an injection step 24, the flowable mixture is injected into a mold cavity using conventional injection molding equipment. During and immediately subsequent to the injection step 24, the heated mixture exhibits a natural tendency for the carbon particles to migrate towards the outer periphery of the mold, while the steel fibers remain at or near the core.

After the injection step, the mold is cooled in a cooling step 26, allowing the polymer to set and form a molded article 10 (FIG. 2). In the example shown in FIG. 2, the molded article is part of a housing for a fuel filter 12.

The finished article is then ejected from the mold in an ejection step 28.

The present invention also relates to an electrically conductive molded article which is a product of the above-described process. In particular, one example of a useful molded article 10 in accordance with the invention is a fuel filter housing.

Referring now to FIG. 3, a portion of a side wall 14 of the article 10 is shown. In the cross-sectional view of FIG. 3, it can be clearly seen that the carbon particles 16 tend to concentrate at or near the surface 15 of the article 10, which gives the article good surface conductivity. In contrast, the stainless steel fibers 18 tend to remain at or near the center or core 17 of the article 10, which advantageously also provides internal conductivity which promotes electrostatic discharge (ESD).

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

I claim:

1. An electrically conductive plastic housing having fuel therein, comprising:
   a) a polymeric material;
   b) electrically conductive metallic fibers; and
   c) electrically conductive carbon particles, wherein said electrically conductive carbon particles are concentrated toward a surface portion of said housing.

2. The electrically conductive housing of claim 1, wherein the polymeric material is selected from the group consisting of nylon polymers, polyacetals, polyamides, polyimides, polyesters, polyolefins, polysulfones, fluoropolymers, and mixtures thereof.

3. The electrically conductive housing of claim 2, wherein the polymeric material is a thermoplastic polymer.

4. The electrically conductive housing of claim 2, wherein the polymeric material is selected from the group consisting of polyacetals and nylon polymers.

5. The electrically conductive housing of claim 4, wherein the polymeric material is a thermoplastic polymer.

6. The electrically conductive housing of claim 1, wherein the electrically conductive metallic fibers comprise stainless steel fibers.

7. The electrically conductive housing of claim 1, wherein the polymeric material is a thermoplastic polymer.

8. The electrically conductive housing of claim 1, wherein the housing is a fuel filter housing.

9. The electrically conductive housing of claim 1 wherein said electrically conductive metallic fibers are not concentrated toward said surface portion of said housing.

* * * * *